(12) United States Patent
Burns

(10) Patent No.: US 7,986,369 B1
(45) Date of Patent: Jul. 26, 2011

(54) WEB CAM STAND SYSTEM

(76) Inventor: David Anthony Burns, Clearwater, FL (US)

(*) Notice: Subject to any disclaimer, the term of this patent is extended or adjusted under 35 U.S.C. 154(b) by 223 days.

(21) Appl. No.: 12/082,622

(22) Filed: Apr. 11, 2008

(51) Int. Cl.
*H04N 5/225* (2006.01)
*F16M 11/04* (2006.01)
*G03B 17/00* (2006.01)

(52) U.S. Cl. .................. 348/375; D16/244; 248/187.1; 396/428

(58) Field of Classification Search .......... D16/242–245
See application file for complete search history.

(56) References Cited

U.S. PATENT DOCUMENTS

| | | | | |
|---|---|---|---|---|
| 5,786,854 A * | 7/1998 | Slade et al. | .................. | 348/373 |
| 6,604,720 B1* | 8/2003 | Wilson | ........................ | 248/177.1 |
| 2004/0145676 A1* | 7/2004 | Lin | ............................... | 348/374 |
| 2006/0119701 A1* | 6/2006 | King | .......................... | 348/14.08 |
| 2008/0053344 A1* | 3/2008 | Almond | ........................ | 108/152 |

* cited by examiner

*Primary Examiner* — Justin P Misleh

(57) ABSTRACT

A lower portion has a lower end and an upper end. The lower end is enlarged for positioning on a floor. An upper portion is movable to any of a plurality of positions. The interior end of the upper portion is coupled to the upper end of the lower portion. Electrical components are coupled to one of the portions. A web camera is operatively coupled to the exterior end of the upper portion. An electrical cable supplies power and data.

1 Claim, 4 Drawing Sheets

FIG 3
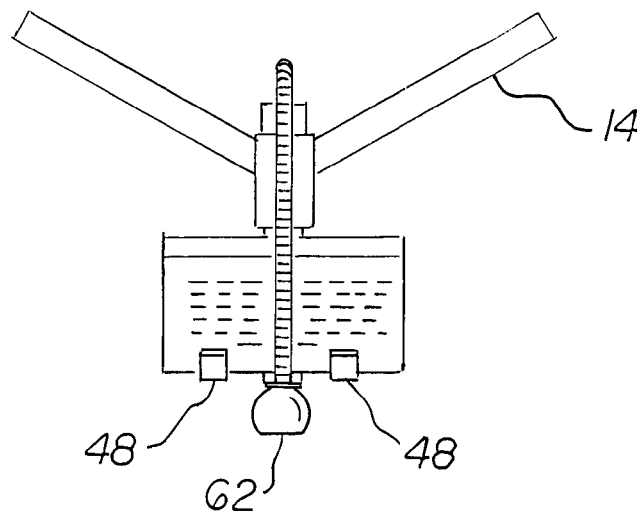
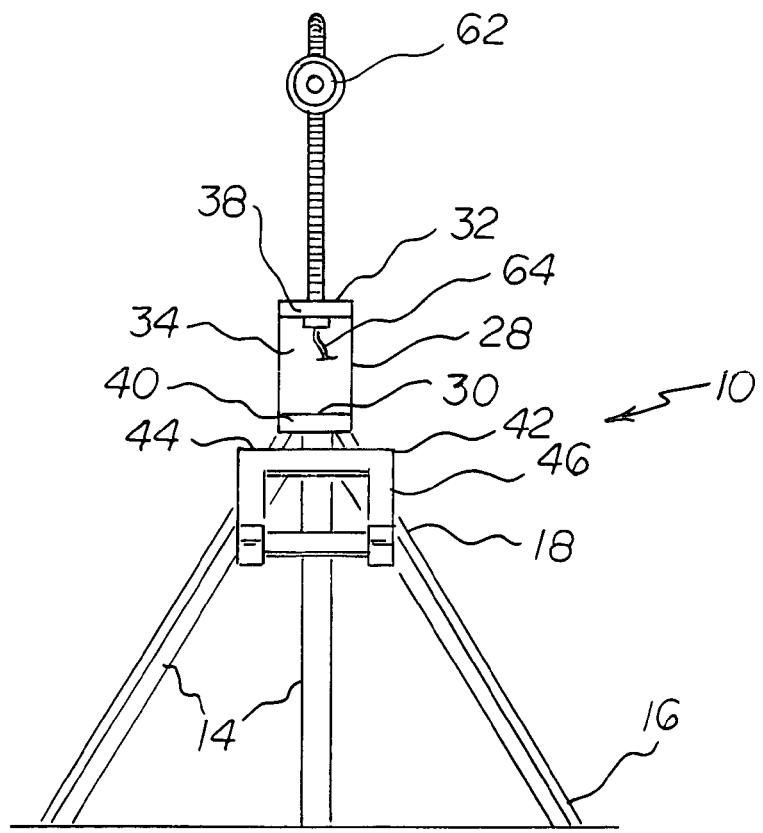
FIG 4

WEB CAM STAND SYSTEM

BACKGROUND OF THE INVENTION

1. Field of the Invention

The present invention relates to a web cam stand system and more particularly pertains to supporting a web cam and associated components in any of a plurality of orientations in a safe, secure, convenient and economical manner.

2. Summary of the Invention

In view of the foregoing disadvantages inherent in the known types of stand systems of known designs and configurations now present in the prior art, the present invention provides an improved web cam stand system. As such, the general purpose of the present invention, which will be described subsequently in greater detail, is to provide a new and improved web cam stand system and method which has all the advantages of the prior art and none of the disadvantages.

To attain this, the present invention essentially comprises a web cam stand system. First provided is a lower portion. The lower portion has three legs. The legs are provided in a tripod configuration. The legs have widely spaced lower ends. The legs have narrowly spaced upper ends. The lower portion is essentially immovable during operation and use.

An upper portion is provided. The upper portion has hollow rings. The rings are coupled in a generally linear configuration. The upper portion has an interior end. The upper portion has an exterior end. The rings are adapted to move with respect to each other upon the exertion of force by a user. The rings are further adapted to remain immovable upon the removal of force by a user.

Provided next is an intermediate portion. The intermediate portion is fabricated in a box-like configuration. The intermediate portion has a horizontal lower plate. The lower plate is attached to the upper ends of the legs. The intermediate portion has a horizontal upper plate. The upper plate supports the interior end of the rings. The intermediate portion has a vertical back plate. The back plate joins the upper and lower plates. In this manner an open front is formed. The open front includes an upper free edge. The upper free edge is formed from the upper plate. The open front also includes a lower free edge. The lower free edge is formed from the lower plate.

An inverted U-shaped bracket is provided. The bracket has a cross piece. The cross piece is coupled to the legs beneath the lower plate. The bracket has downwardly extending fingers. The fingers terminate outwardly and upwardly extending lower ledges.

A personal computer is provided next. The personal computer has a keyboard. The keyboard is removably supported on the bracket. The personal computer has a screen. The screen is vertically positionable between the upper and lower ledges.

Further provided is a power strip. A plurality of electric receptacles is provided. The power strip is secured to the back plate with the plurality of electric receptacles. The electric receptacles are adapted to provide power to any of a plurality of electrical components. The power strip also includes a line. The line brings electrical power to the strip.

Provided last is a web camera. The web camera is coupled to the exterior end of the rings. An electric cable extends through the rings. In this manner the web camera and the personal computer are connected.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved web cam stand system which has all of the advantages of the prior art stand systems of known designs and configurations and none of the disadvantages.

It is another object of the present invention to provide a new and improved web cam stand system which may be easily and efficiently manufactured and marketed.

It is further object of the present invention to provide a new and improved web cam stand system which is of durable and reliable constructions.

An even further object of the present invention is to provide a new and improved web cam stand system which is susceptible of a low cost of manufacture with regard to both materials and labor, and which accordingly is then susceptible of low prices of sale to the consuming public, thereby making such web cam stand system economically available to the buying public.

Even still another object of the present invention is to provide a web cam stand system for supporting a web cam and associated components in any of a plurality of orientations in a safe, secure, convenient and economical manner.

Lastly, it is an object of the present invention to provide a new and improved web cam stand system. From a generic view point, a lower portion has a lower end and an upper end. The lower end is enlarged for positioning on a floor. An upper portion is movable to any of a plurality of positions. The interior end of the upper portion is coupled to the upper end of the lower portion. Electrical components are coupled to one of the portions. A web camera is operatively coupled to the exterior end of the upper portion. An electrical cable supplies power and data.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a plan view of the system taken along line 3-3 of FIG. 1.

FIG. 4 is a front elevational view of the system similar to FIG. 1 but with the personal computer removed.

The same reference numerals refer to the same parts throughout the various Figures.

DESCRIPTION OF THE PREFERRED EMBODIMENT

Figure 1:
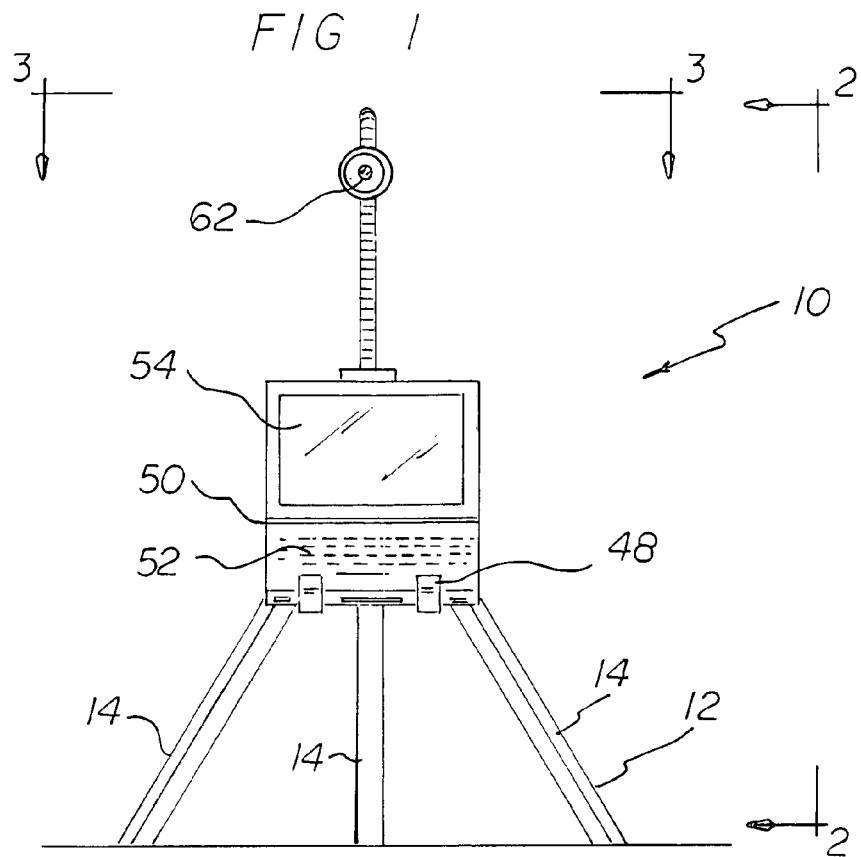
FIG. 1 is a front elevational view of a web cam stand system constructed in accordance with the principles of the present invention.
Figure 2:
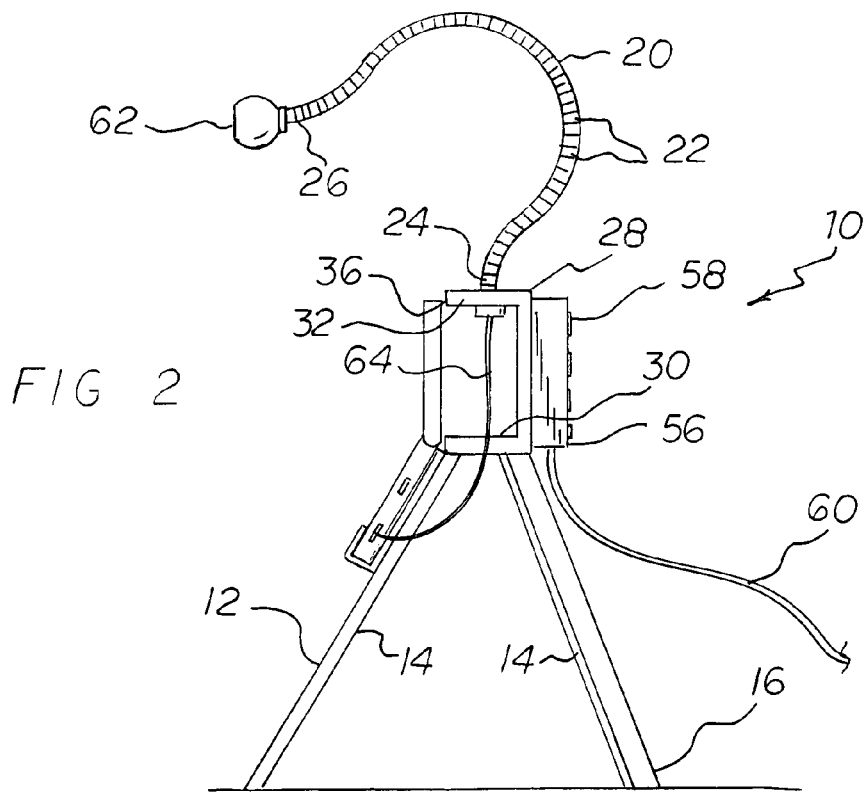
FIG. 2 is a side elevational view of the system taken along line 2-2 of FIG. 1.

With reference now to the drawings, and in particular to FIG. 1 thereof, the preferred embodiment of the new and improved web cam stand system embodying the principles and concepts of the present invention and generally designated by the reference numeral 10 will be described.

The present invention, the web cam stand system 10 is comprised of a plurality of components. Such components in their broadest context include a lower portion, an upper portion, electrical components and a web camera. Such components are individually configured and correlated with respect to each other so as to attain the desired objective.

First provided is a lower portion 12. The lower portion has three legs 14. The legs are provided in a tripod configuration. The legs have widely spaced lower ends 16. The legs have narrowly spaced upper ends 18. The lower portion is essentially immovable during operation and use.

An upper portion 20 is provided. The upper portion has hollow rings 22. The rings are coupled in a generally linear configuration. The upper portion has an interior end 24. The upper portion has an exterior end 26. The rings are adapted to move with respect to each other upon the exertion of force by a user. The rings are further adapted to remain immovable upon the removal of force by a user.

Provided next is an intermediate portion 28. The intermediate portion is fabricated in a box-like configuration. The intermediate portion has a horizontal lower plate 30. The lower plate is attached to the upper ends of the legs. The intermediate portion has a horizontal upper plate 32. The upper plate supports the interior end of the rings. The intermediate portion has a vertical back plate 34. The back plate joins the upper and lower plates. In this manner an open front 36 is formed. The open front includes an upper free edge 38. The upper free edge is formed from the upper plate. The open front also includes a lower free edge 40. The lower free edge is formed from the lower plate.

An inverted U-shaped bracket 42 is provided. The bracket has a cross piece 44. The cross piece is coupled to the legs beneath the lower plate. The bracket has downwardly extending fingers 46. The fingers terminate outwardly. The bracket also has upwardly extending lower ledges 48.

A personal computer 50 is provided next. The personal computer has a keyboard 52. The keyboard is removably supported on the bracket. The personal computer has a screen 54. The screen is vertically positionable between the upper and lower ledges.

Further provided is a power strip 56. A plurality of electric receptacles 58 is provided. The power strip is secured to the back plate with the plurality of electric receptacles. The electric receptacles are adapted to provide power to any of a plurality of electrical components. The power strip also includes a line 60. The line brings electrical power to the strip.

Provided last is a web camera 62. The web camera is coupled to the exterior end of the rings. An electric cable 64 extends through the rings. In this manner the web camera and the personal computer are connected.

Figure 5:
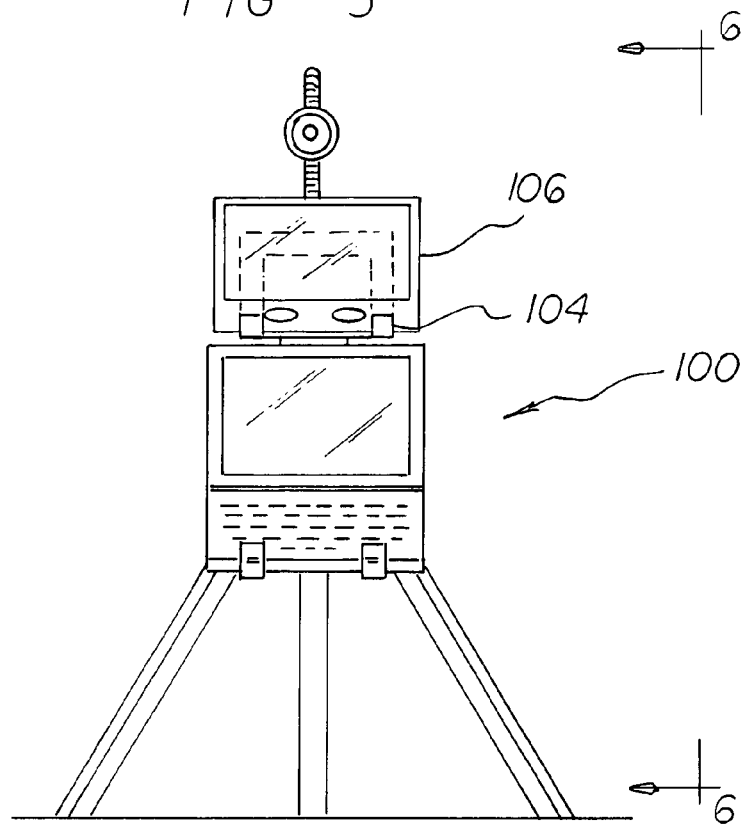
FIG. 5 is a front elevational view of a web cam stand system constructed in accordance with an alternate embodiment of the invention.
Figure 6:
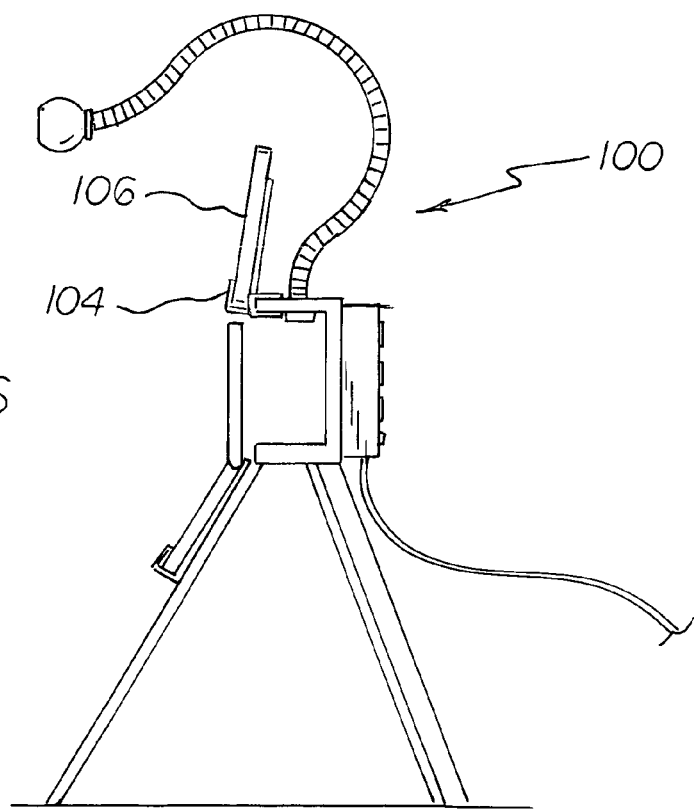
FIG. 6 is a side elevational view taken along line 6-6 of FIG. 5.

An alternate embodiment 100 of the invention is shown in FIGS. 5 and 6. An upper bracket 104 is provided. The upper bracket is provided in proximity to the lower end of the upper portion. A video display 106 is provided. The video display is provided on the upper bracket.

Figure 7:
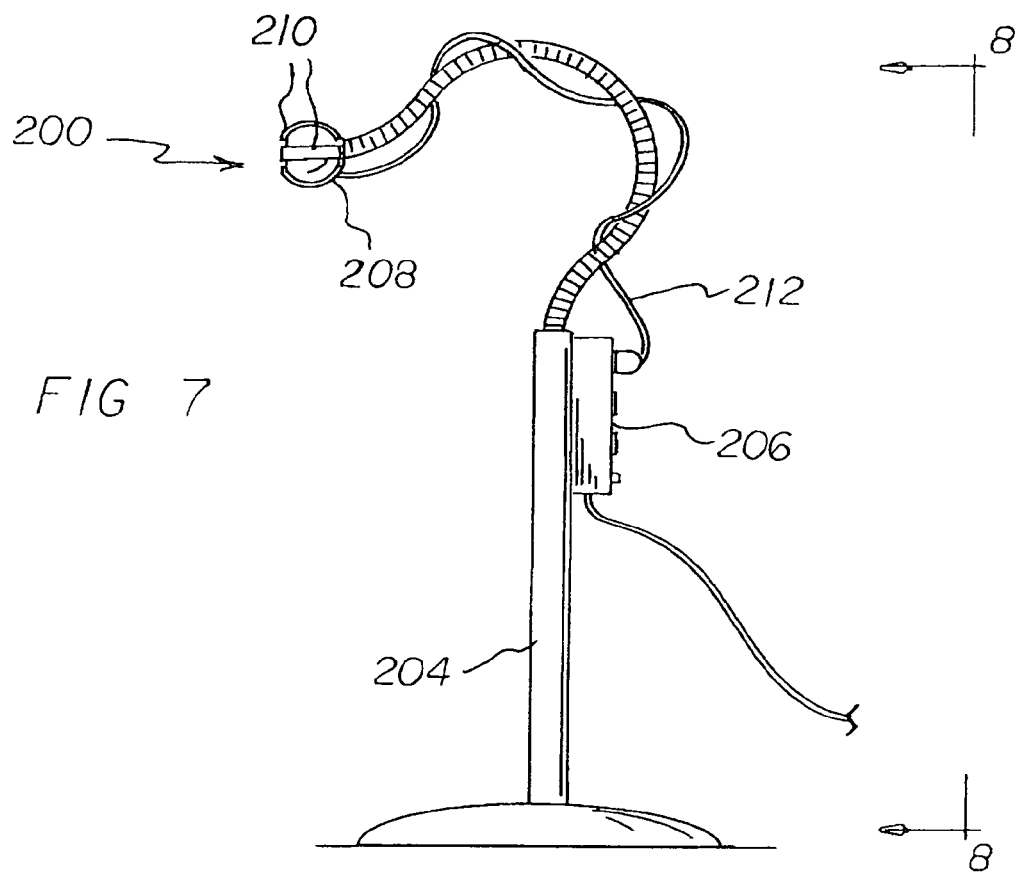
FIG. 7 is a side elevational view of a web cam stand system constructed in accordance with another alternate embodiment of the invention.
Figure 8:
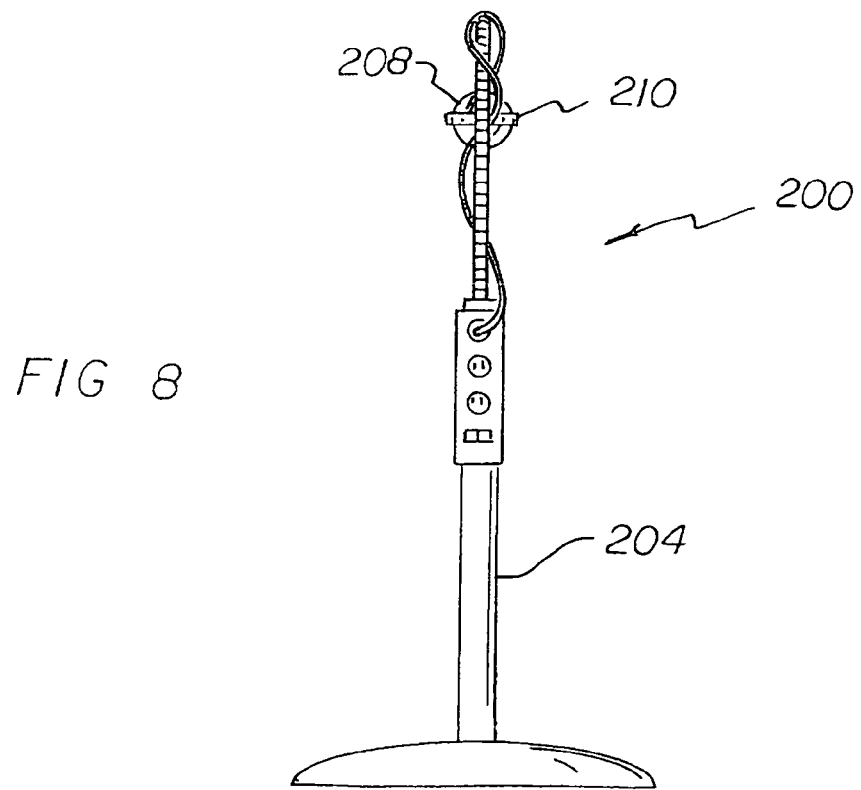
FIG. 8 is a rear elevational view taken along line 8-8 of FIG. 7.

Another alternate embodiment 200 of the invention is shown in FIGS. 7 and 8. The lower portion is a vertical post 204. The vertical post has a circular base.

A power strip 206 is provided. The power strip is provided on the lower portion.

A clamp 210 is provided. The clamp is provided on the exterior end of the upper portion. The clamp releasably supports the web camera 208. A cord 212 is provided. The cord extends from the web camera. In this manner power and data are supplied.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A web cam stand system for supporting a web cam and associated components in any of a plurality of orientations in a safe, secure, convenient and economical manner comprising, in combination:

a lower portion fabricated of three legs in a tripod configuration with widely spaced lower ends and narrowly spaced upper ends, the lower portion being generally immovable during operation and use;

an upper portion fabricated of hollow rings coupled in a generally linear configuration with an interior end and an exterior end, the rings adapted to move with respect to each other upon the exertion of force by a user and adapted to remain immovable upon the removal of force by a user;

an intermediate portion fabricated in a box-like configuration with a horizontal lower plate attached to the upper ends of the legs and a horizontal upper plate supporting the interior end of the rings and with a vertical back plate joining the upper and lower plates and forming an open front, the open front including an upper free edge formed from the upper plate and a lower free edge formed from the lower plate;

an inverted U-shaped bracket having a cross piece coupled to the legs beneath the lower plate and downwardly extending fingers terminating outwardly and upwardly extending lower ledges;

a personal computer having a keyboard removably supported on the bracket and a screen vertically positionable between the upper and lower ledges;

a power strip secured to the back plate with a plurality of electric receptacles adapted to provide power to any of a plurality of electrical components, the power strip also including a line for bringing electrical power to the strip; and a web camera coupled to the exterior end of the rings with an electric cable extending through the rings and connecting the web camera and the personal computer.

* * * * *